(12) United States Patent
Yoon

(10) Patent No.: US 7,858,228 B2
(45) Date of Patent: Dec. 28, 2010

(54) RECHARGEABLE BATTERY

(75) Inventor: Heuisang Yoon, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 753 days.

(21) Appl. No.: 11/490,025

(22) Filed: Jul. 21, 2006

(65) Prior Publication Data

US 2007/0026302 A1    Feb. 1, 2007

(30) Foreign Application Priority Data

Jul. 26, 2005    (KR) .................... 10-2005-0067974

(51) Int. Cl.
| | |
|---|---|
| H01M 2/12 | (2006.01) |
| H01M 2/30 | (2006.01) |
| H01M 2/04 | (2006.01) |
| H01M 2/06 | (2006.01) |
| H01M 2/08 | (2006.01) |
| H01M 10/50 | (2006.01) |

(52) U.S. Cl. .................... 429/175; 429/181; 429/185; 429/56; 429/62; 429/7; 29/623.1

(58) Field of Classification Search .............. 429/7, 429/61, 149, 330, 213, 184, 326, 175, 32, 429/152, 217, 209, 303, 185, 56
See application file for complete search history.

(56) References Cited

U.S. PATENT DOCUMENTS 5,766,790 A * 6/1998 Kameishi et al. .............. 429/56
2002/0142195 A1 10/2002 Ehara
2004/0091769 A1* 5/2004 Kawabata et al. ........... 429/163
2004/0115521 A1* 6/2004 Cho ............................ 429/72

FOREIGN PATENT DOCUMENTS

| | | |
|---|---|---|
| CN | 1465109 | 12/2003 |
| CN | 1499654 | 5/2004 |
| EP | 0 959 508 | 11/1999 |
| JP | 2003-77434 | 3/2003 |
| JP | 2003-282038 | 10/2003 |
| JP | 2003-282039 | 10/2003 |
| JP | 2004-152670 | 5/2004 |
| JP | 2004-221024 | 8/2004 |
| JP | 2004-253381 | 9/2004 |

OTHER PUBLICATIONS

Search Report issued in European Patent Application No. 06117841.4 on Oct. 24, 2006.

* cited by examiner

*Primary Examiner*—Jonathan Crepeau
*Assistant Examiner*—Kenneth Douyette
(74) *Attorney, Agent, or Firm*—Knobbe Martens Olson & Bear LLP

(57) ABSTRACT

A rechargeable battery includes a case having an opening; an electrode assembly accommodated into the case and having first and second electrode taps protruding upwardly; a cap assembly including a cap plate covering the opening of the case and a electrode terminal insulated from the cap plate; first and second electrode leads connected to the electrode terminal and the cap plate, respectively; a circuit board connected to the cap assembly by the first and second electrode leads; a resin portion filling a space between the cap assembly and the circuit board; and an insulation reinforcing portion insulating the cap assembly from the first electrode lead and the cap plate. With the insulation reinforcing portion, it is possible to prevent the cap assembly from separating from the resin portion under external pressure.

9 Claims, 2 Drawing Sheets

RECHARGEABLE BATTERY

CROSS-REFERENCE TO RELATED APPLICATION

This application claims the benefit of Korean Patent Application No. 2005-67974, filed on Jul. 26, 2005, in the Korean Intellectual Property Office, the disclosure of which is incorporated herein in its entirety by reference.

BACKGROUND OF THE INVENTION

1. Field of the Invention

Aspects of the present invention relate to a rechargeable battery, and more particularly, to a rechargeable battery having a prismatic shape capable of not deforming under pressure.

2. Description of the Related Art

Recently, a large number of compact and light-weight electric or electronic apparatuses such as cellular phones, notebooks, and camcorders have been developed and produced. These portable electric or electronic apparatuses are provided with battery packs, so that these apparatuses can operate without separate power supplies. The battery pack includes at least one battery for outputting a voltage having a predetermined level to drive the portable electric or electronic apparatuses for a predetermined time.

Typically, the battery packs have employed a rechargeable batteries to provide economical efficiency. As representative examples of rechargeable batteries, there are nickel cadmium (Ni—Cd) batteries, nickel hydride (Ni—MH) batteries, and lithium rechargeable batteries such as lithium (Li) polymer batteries and lithium ion (Li-ion) batteries.

Particularly, a lithium rechargeable battery has an operating voltage of 3.6V, which is three times higher than that of a Ni—Cd battery or a Ni—MH battery. In addition, the lithium rechargeable battery has a high energy density per unit weight. Therefore, the demand for lithium rechargeable batteries has rapidly increased.

For lithium rechargeable batteries, a lithium-based oxide is used as a positive electrode active material, and carbon is used as a negative electrode active material. In general, the lithium rechargeable batteries are classified into liquid electrolyte batteries and polymer electrolyte batteries according to the type of electrolyte. A lithium rechargeable battery that uses a liquid electrolyte is called a lithium ion battery, and a lithium rechargeable battery that uses a polymer electrolyte is called a lithium polymer battery. Lithium rechargeable batteries are manufactured in various shapes and may be classified into a can-type battery, a prismatic battery, and a pouch-type battery according to the shapes.

In general, a lithium rechargeable battery is constructed with a case, a jelly-roll-type electrode assembly accommodated into the case, and a cap assembly covering the upper portion of the case.

The electrode assembly is constructed by rolling a positive electrode plate coated with a positive electrode active material, a negative electrode plate coated with a negative electrode active material, and a separator. The separator is interposed between the positive and negative electrode plates to prevent a short circuit between the two electrode plates and to allow only lithium ions (Li-ions) to pass through. In addition, an electrolyte solution is contained in the case to enable the lithium ions to move.

The cap assembly is engaged with the upper opening of the case where the electrode assembly is accommodated. The cap assembly is provided with a plate-shaped cap plate having the same size and shape as the opening of the case. A central portion of the cap plate is provided with a terminal hole through which an electrode terminal passes. A tube-shaped gasket is provided to surround the outside of the electrode terminal in order to electrically insulate the electrode terminal from the cap plate. An insulating plate is disposed on a bottom surface of the cap plate, and a terminal plate connected to the electrode terminal is disposed on a bottom surface of the insulating plate.

One side of the cap plate is provided with a safety vent to prevent an explosion due to a rise in pressure inside the case, and a protrusion protruding upwardly is provided around the safety vent to prevent resin injected into the upper portion of the cap plate from twisting due to external pressure. The upper portion of the protrusion is provided with an auxiliary protrusion to strengthen a supporting force for preventing torsion on the resin.

In addition, the top surface of the cap plate is provided with an insulating tape to insulate the electrode terminal from the cap plate.

However, the safety vent of a conventional rechargeable battery may be damaged by the resin injected into the upper portion of the cap plate.

Another disadvantage of a conventional rechargeable battery is that, after providing the insulating tape to the top surface of the cap plate, the upper portion of the protrusion is provided with the auxiliary protrusion, so that additional processes in production must be performed.

SUMMARY OF THE INVENTION

Aspects of the present invention provide a rechargeable battery capable of reducing the number of manufacturing processes by integrating a reinforcing member for standing against pressure applied to a cap plate into an insulating member.

According to an aspect of the present invention, there is provided a rechargeable battery including: a case having an opening; an electrode assembly accommodated into the case and having first and second electrode taps protruding from the electrode assembly; a cap assembly including a cap plate covering the opening of the case and a electrode terminal insulated from the cap plate; first and second electrode leads connected to the electrode terminal and the cap plate, respectively; a circuit board connected to the cap assembly by the first and second electrode leads and wherein a space is defined between the circuit board and the cap assembly; a resin portion filling the space between the cap assembly and the circuit board; and an insulation reinforcing portion insulating the cap assembly from the first electrode lead and the cap plate.

According to an aspect of the present invention, the rechargeable battery may further include a current breaking member connected to the first or second electrode lead to break the current between the rechargeable battery and an outside thereof. The current breaking member may be constructed with a positive temperature coefficient (PTC) thermistor.

According to an aspect of the present invention, the insulation reinforcing portion may include an integrally-formed covering member that covers a portion of the cap plate. The reinforcing member may protrude upwardly, and the covering member may be thin plate-shaped.

According to an aspect of the present invention, the cap plate may further include a safety vent and the insulation reinforcing member may further include a safety vent protecting member formed at a bottom surface of the covering member to protect the safety vent.

According to an aspect of the present invention, the case may be a prismatic case.

According to another aspect of the present invention, a method of manufacturing a rechargeable battery comprises inserting an electrode assembly into a case having an opening; covering the opening of the case with a cap assembly that includes a cap plate; placing an insulation reinforcing portion on the cap plate, wherein the insulation reinforcing portion includes a covering member that covers a portion of the cap plate and a reinforcing member; connecting a circuit board to the cap assembly such that a space is provided between the circuit board and the cap plate of the cap assembly; injecting a resin into the space between the circuit board and the cap plate of the cap assembly, wherein the resin is prevented by the reinforcing member of the insulation reinforcing portion from separating from the cap assembly.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
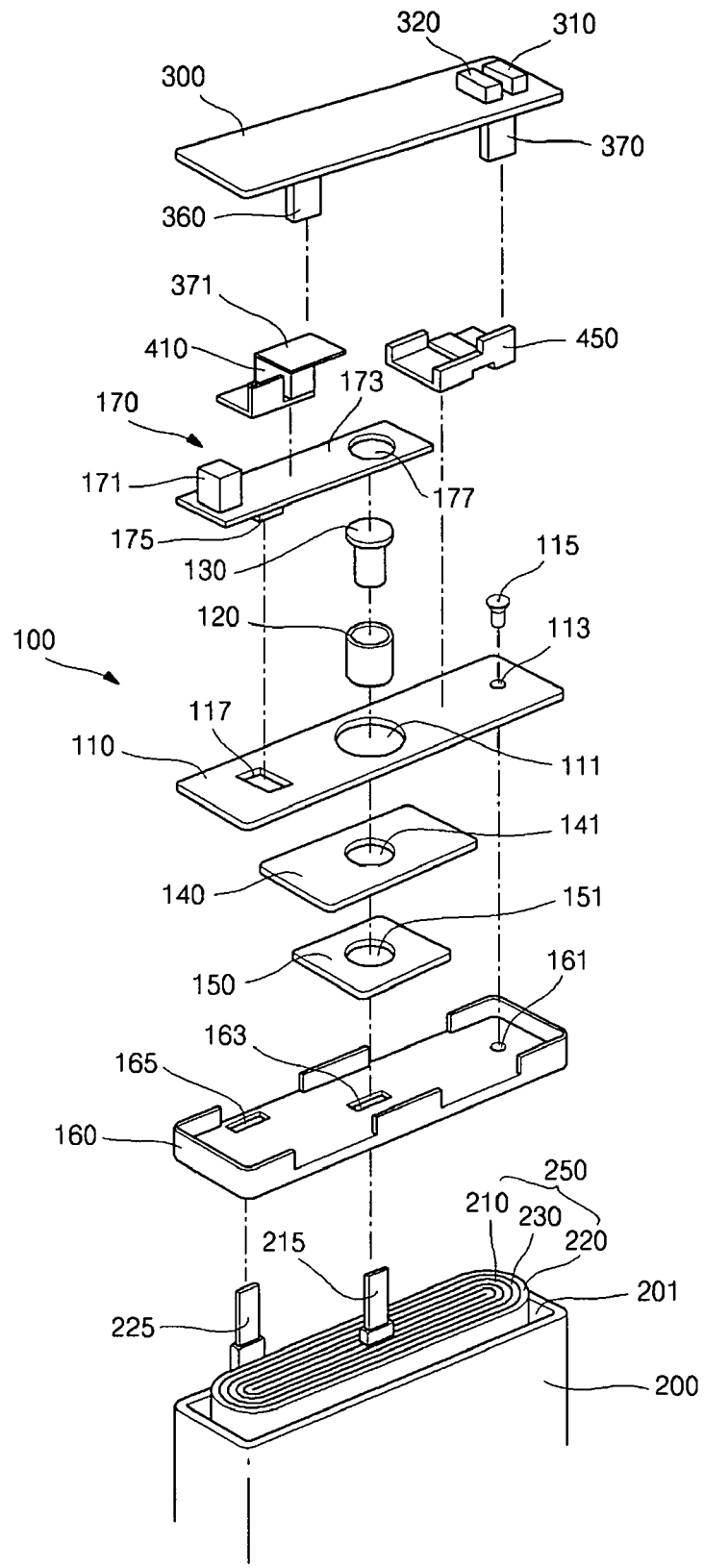
FIG. 1 is a perspective exploded view showing a rechargeable battery according to an aspect of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A rechargeable battery according to an embodiment of the present invention will be described in detail with reference to the accompanying drawings.

Figure 2:
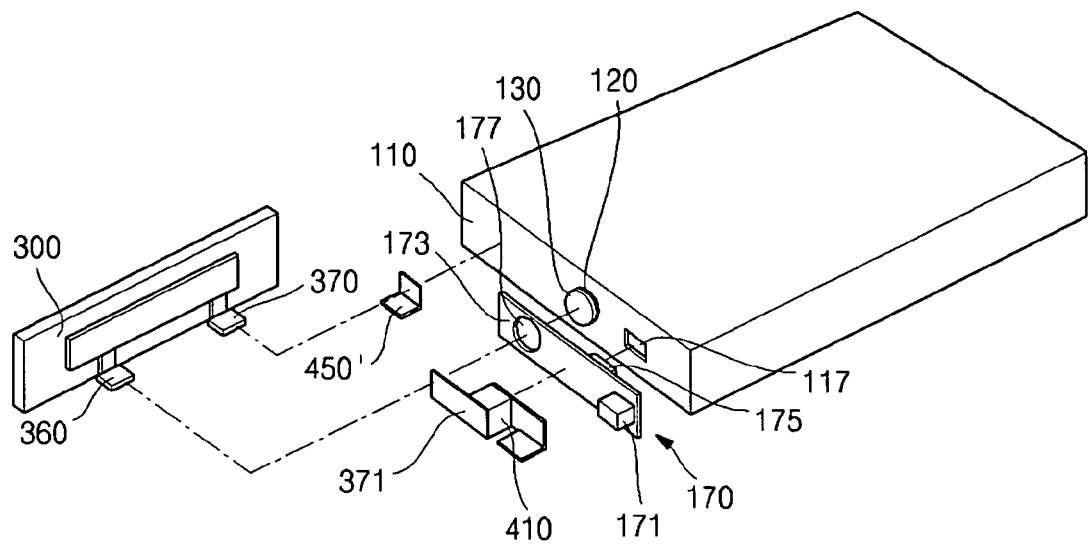
FIG. 2 is a perspective exploded view showing parts of the rechargeable battery according to another example of present invention.
Figure 3:
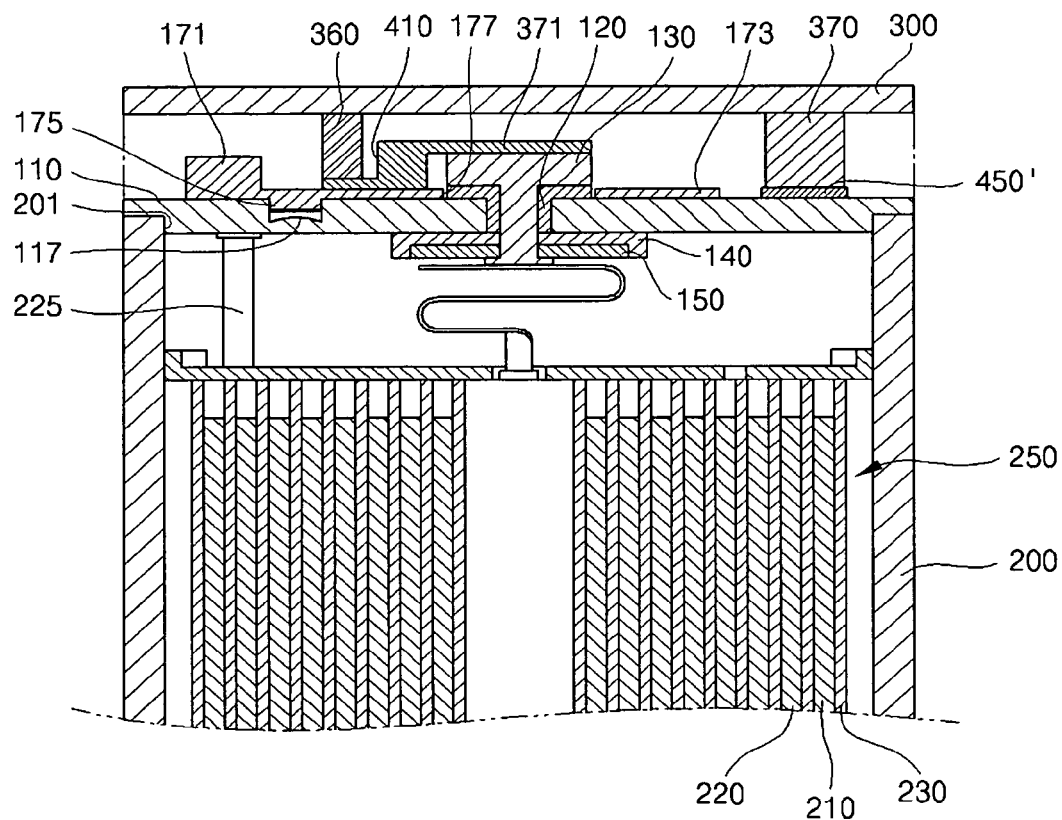
FIG. 3 is a cross sectional view showing the rechargeable battery of FIG. 2.

FIG. 1 is a perspective exploded view showing a rechargeable battery according to an aspect of the present invention. FIG. 2 is a perspective exploded view showing parts of the rechargeable battery according to another example of present invention. FIG. 3 is a cross sectional view showing the rechargeable battery of FIG. 2.

Referring to FIGS. 1 to 3, the rechargeable battery has a bare cell including a case 200 having an opening 201 at one side thereof, an electrode assembly 250 which is accommodated into the case 200, and a cap assembly 100 which is engaged with the opening 201 to seal an upper portion of the case 200.

In the embodiment, the case 200 has a shape of a rectangular box and may be made of aluminum or an aluminum alloy. An electrode assembly 250 and an electrolyte solution are accommodated into the case 200 through the opening 201 thereof. The case 200 may serve as one of first and second electrode terminals.

The electrode assembly 250 is formed to have the shape of a thin plate or film. In order to form the electrode assembly 250, a stacked structure is constructed by stacking the first electrode 210, which is connected to a first electrode tap 215, the separator 230, and the second electrode 220, which is connected to a second electrode tap 225. Then, the stacked structure is rolled into the shape of a roll. Either the first or second electrode 210 or 220 may be the negative electrode and the other electrode may be the positive electrode. Preferably, the first electrode 210 is the negative electrode.

The negative electrode includes a negative current collector constructed with a conductive metal thin film such as a copper foil and a negative active material layer coating surfaces on both sides of the current collector. The negative active material layer may be mostly made of carbon. A negative terminal is connected to a region of the negative current collector where the negative electrode active material layers are not formed. The negative terminal protrudes upwardly. (As used herein, the term "upwardly" is used with reference to the orientation of the rechargeable battery of FIG. 1. In other words, "upwardly" here refers to extending in a direction away from the closed end of the battery case. Further, as used herein the term "bottom" refers to the closed end of the battery case or, in the case of a structural member, the terms "bottom" or "bottom surface" refer to a side that faces the closed end of the battery. Likewise, the term "top" or "top surface" refers to a side facing away from the closed end of the battery.)

The positive electrode includes a positive current collector constructed with a highly conductive metal thin film such as an aluminum foil and a positive electrode material active layer coating surfaces on both sides of the current collector. The positive electrode material active layer may be mostly made of a lithium oxide. A positive terminal is connected to a region of the positive current collector where the positive electrode active material layers are not formed, and the positive terminal protrudes upwardly.

The separator 230 is made of polyethylene, polypropylene, or a co-polymer thereof, as non-limiting examples. The separator 230 is constructed to be wider than the first and second electrode 210 and 220 in order to effectively prevent a short circuit between the two electrode plates.

The cap assembly 100 covers the opening 201 of the case 200 to seal the case 200. The cap assembly 100 is provided with a plate-shaped cap plate 110 having the same size and shape as the opening 201 of the case 200. A bottom surface of the cap plate 110 is provided with an insulating plate 140. A bottom surface of the insulating plate 140 is provided with a terminal plate 150, which is electrically connected to the first electrode tap 215 disposed on the first electrode 210.

A central portion of the cap plate 110 is provided with a first terminal hole 111 through which the electrode terminal 130 passes to be connected to the first electrode tap 215. The first terminal hole 111 is provided with an insulating gasket 120 having a tubular shape in order to electrically insulate the electrode terminal 130 from the cap plate 110.

In addition, one side of the cap plate 110 is provided with an electrolyte solution injection hole 113 having a predetermined size. After the cap assembly 100 is engaged with the opening 201 of the case 200, an electrolyte solution is injected through the electrolyte solution injection hole 113. After that, the electrolyte solution injection hole 113 is closed off with a stopper 115.

The other side of the cap plate 110 is provided with a safety vent 117. The safety vent 117 is provided preferably at a top surface of the cap plate 110, and is formed as a notch having a width less than the width of the cap plate 110.

The insulating plate 140 is made of the same insulating material as that of the insulating gasket 120. The insulating plate 140 is disposed on a bottom surface of the cap plate 110. The insulating plate 140 is provided with a second terminal hole 141. The second terminal hole 141 is formed to correspond to the first terminal hole 111 of the cap plate 110 and be connected to the first terminal hole 111.

The terminal plate 150 may be made of Ni or a Ni alloy. The terminal plate 150 is disposed on a bottom surface of the insulating plate 140. The terminal plate 150 is provided with a third terminal hole 151. The third terminal hole 151 is formed to correspond to the first terminal hole 111.

The insulating case 160 is disposed over the upper portion of the electrode assembly 250 to insulate the electrode assembly 250 from the cap plate 110. The insulating case 160 is provided with first and second electrode tap insert holes 163 and 165 through which the first and second electrode taps 215 and 225 pass as the first and second electrode taps 215 and 225 protrude upwardly from the electrode assembly 250. The insulating case 160 further includes an injection hole 161 that aligns with the electrolyte solution injection hole 113 of the cap plate 110. The insulating case 160 is made of an insulating polymer resin. Preferably, the insulating case 160 is made of polypropylene. However, the present invention is not limited thereto.

The top surface of the cap plate 110 is provided with an insulation reinforcing portion 170. The insulation reinforcing portion 170 may be attached to the cap plate 110 by adhesives and is constructed by integrating a covering member 173 that covers the cap plate 110 into a reinforcing member 171 provided to one side of the covering member 173. The covering member 173 includes a fourth terminal hole 177 through which the electrode terminal 130 passes. The reinforcing member 171 protrudes upwardly by a predetermined height from a top surface of the covering member 173. A resin is injected between a protecting circuit board 300 described later and the cap plate 110 and the reinforcing member strengthen the adhesion between the resin and the cap plate 110. According to an embodiment of the present invention, a bottom surface of the insulation reinforcing portion 170 may be provided with a safety vent protecting member 175 formed to correspond to the safety vent 117 of the cap plate 110. According to this embodiment, it is possible to prevent damage to the safety vent 117 that may be caused by the injection of the resin. The insulation reinforcing portion 170 may be integrally formed. That is, the covering member 173, reinforcing member 171 and safety vent protecting member 175, if present, may be formed together as one piece or pre-connected such that the insulation reinforcing portion 170 including the covering member 173, reinforcing member 171 and safety vent protecting member 175, if present, can be provided to the top surface of the cap plate 110 in the same manufacturing operation.

The first and second electrode tabs 215 and 225 protruding from the electrode assembly 250 are connected to the cap plate 110 and the electrode terminal 130. The cap plate 110 and the electrode terminal 130 are connected to the protecting circuit board 300 by first and second electrode leads 360 and 370, respectively. The reference numerals 310 and 320 in FIG. 1 are external terminals of the cell and the reference numerals 450, 450' are lead plate electrically connecting the cap plate 110 and to the second electrode lead 370.

A current breaking member 410 that breaks currents may be connected to one of positive and negative electrodes. In the present embodiment, the current breaking member is connected to the first electrode lead and to the electrode terminal on the insulation reinforcing portion to break currents. The current breaking member 410 breaks charging or discharging currents when temperature or pressure inside the case 200 rises inordinately. The current breaking member 410 is a device having electric resistance that increases infinitely at temperatures above a predetermined level. A positive temperature coefficient (PTC) material, such as a PTC thermistor, may be used for the current breaking member 410.

The protecting circuit board 300 is constructed with a synthetic resin panel that includes circuit chips. In the event that the electrode terminal 130 and the cap plate 110 having different polarities become connected to each other, the chemical composition of the battery may become unstable, so that the battery may become overcharged or an overcurrent may flow. As a result, a leak, fire, or explosion may occur, thereby degrading the performance of the battery. Therefore, in order to prevent deterioration in the performance of the battery, the protecting circuit board 300 is connected with the first and second electrode leads 360 and 370 in order to check the voltage of the bare cell, thereby preventing overcharging.

According to the present embodiment, a resin portion (not shown in the figures) fills a space between the current-breaking member 410 and the cap assembly 110.

Now, processes of assembling the aforementioned rechargeable battery according to an aspect of the present invention will be described in detail.

First, the electrode assembly 250 is inserted into the case 200.

The insulating case 160 is disposed over the upper portion of the electrode assembly 250. The first and second electrode taps 215 and 225, which protrude upwardly from the electrode assembly 250 and the case 200, protrude through the first and second electrode tap insert holes 163 and 165 that are provided in the insulating case 160.

Next, the cap plate 110, the insulating plate 140, and the terminal plate 150 are sequentially disposed to connect the first, second, and third terminal holes 111 and 141 and 151. The electrode terminal 130, which passes through the cap plate 110, the insulating plate 140, and the terminal plate 150, is inserted into the first, second, and third terminal holes 111 and 141 and 151 with a predetermined rotational force.

In the embodiment described herein, the electrode terminal 130 is insulated from the cap plate 110 by the gasket 120 and is assembled through the first terminal hole 111 of the cap plate 110, so that the terminal plate 150 is electrically insulated from the cap plate 110 and is electrically connected to the electrode terminal 130.

The cap assembly 100 seals the opening 201 of the case 200. In the embodiment described herein, the electrode terminal 130 and the cap plate 110, which are connected with the first and second electrode taps 215 and 225, respectively, are connected to the protecting circuit board 300 by way of the first and second electrode leads 360 and 370.

In the embodiment described herein, the electrode terminal 130, which is a negative electrode, is connected to the current breaking member 410 by the connecting lead 371. As described above, the current breaking member 410 may be made of a PTC material that creates a break in the circuit when abnormal situations occur.

The insulation reinforcing portion 170 is disposed on the top surface of the cap plate 110. More specifically, the plate-shaped covering member 173 of the insulation reinforcing portion 170 covers the top surface of the cap plate 110, the safety vent protecting member 175 formed in the bottom surface of the covering member 173 is inserted into the upper portion of the safety vent 117, and the reinforcing member 171 protrudes upwardly from the cap plate 110.

The protecting circuit board 300 is fastened to the cap assembly 100 of the rechargeable battery so that a space is provided between the protecting circuit board 300 and the cap plate 110, and then resin is injected between the protecting circuit board 300 and the cap plate 110.

In the embodiment described herein, the resin portion may apply pressure to the safety vent 117 formed in the cap plate 110, but the resin portion is prevented from damaging the safety vent by the safety vent protecting member 175 that is included in the insulation reinforcing portion 170.

In addition, when the resin fills in the rechargeable battery, the reinforcing member 171 included in the insulation reinforcing portion 170 can prevent the cap assembly 100 from separating from the resin portion.

According to an aspect of the present invention, the insulation reinforcing portion is constructed by integrating the reinforcing member into the covering member, so that the number of manufacturing processes can be reduced.

In addition, the rechargeable battery may be constructed so that the insulation reinforcing portion reinforces the resin portion injected between the case and the cap assembly, thereby preventing the cap assembly from separating from the resin portion under external pressure.

Moreover, the injected resin portion is prevented from damaging the safety vent formed in the cap plate by the safety vent protecting member formed in the insulation reinforcing portion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A rechargeable battery comprising:
a case having an opening;
an electrode assembly accommodated in the case and having first and second electrode taps that protrude from the electrode assembly;
a cap assembly comprising a cap plate covering the opening of the case and an electrode terminal insulated from the cap plate, wherein the cap plate includes a safety vent formed as a notch in the cap plate;
first and second electrode leads connected to the electrode terminal and the cap plate, respectively;
a circuit board connected to the cap assembly by the first and second electrode leads and wherein a space is defined between the circuit board and the cap assembly;
a resin portion filling the space between the cap assembly and the circuit board; and
an insulation reinforcing portion insulating the cap plate from the first electrode lead and including an integrally formed covering member that covers a portion of one side of the cap plate including the safety vent and further comprises a safety vent protecting member formed at a bottom surface of the covering member and extending into the notch to protect the safety vent.

2. The rechargeable battery according to claim 1, wherein the insulation reinforcing portion includes a reinforcing member that protrudes upwardly.

3. The rechargeable battery according to claim 1, wherein the covering member is thin plate-shaped.

4. The rechargeable battery according to claim 1, wherein the case is a prismatic case having a rectangular parallelepiped shape.

5. The rechargeable battery according to claim 1, further comprising a current breaking member connected to the first electrode lead and to the electrode terminal on the insulation reinforcing portion.

6. The rechargeable battery according to claim 5, wherein the current breaking member comprises a PTC (positive temperature coefficient) thermistor.

7. The rechargeable battery according to claim 1, wherein the circuit board monitors the voltage of the rechargeable battery to protect against overcharging.

8. A method of manufacturing a rechargeable battery comprising:
inserting an electrode assembly into a case having an opening;
covering the opening of the case with a cap assembly that includes a cap plate, wherein the cap plate includes a safety vent formed as a notch in the cap plate;
placing an insulation reinforcing portion on the cap plate, wherein the insulation reinforcing portion includes a covering member that covers a portion of the cap plate including the safety vent and wherein the insulation reinforcing portion includes a reinforcing member that protrudes from the insulation reinforcing portion and a safety vent protecting member that extends into the notch;
connecting a circuit board to the cap assembly such that a space is provided between the circuit board and the cap plate of the cap assembly and between the circuit board and the insulation reinforcing portion; and
injecting a resin into the space between the circuit board and the cap plate of the cap assembly and between the circuit board and the insulation reinforcing portion, wherein the resin is prevented by the reinforcing member of the insulation reinforcing portion from separating from the cap assembly and wherein the safety vent protecting member extending into the notch protects the safety vent from being damaged when the resin is injected.

9. The method of claim 8, wherein the insulation reinforcing portion including the covering member, reinforcing member and safety vent protecting member is integrally formed.

* * * * *